(12) United States Patent
Ting

(10) Patent No.: US 7,398,549 B2
(45) Date of Patent: Jul. 8, 2008

(54) BIOMETRIC AUTHENTICATION WITH SECURITY AGAINST EAVESDROPPING

(75) Inventor: David M. T. Ting, Sudbury, MA (US)

(73) Assignee: Imprivata, Inc., Cambridge, MA (US)

( * ) Notice: Subject to any disclaimer, the term of this patent is extended or adjusted under 35 U.S.C. 154(b) by 838 days.

(21) Appl. No.: 10/147,789

(22) Filed: May 17, 2002

(65) Prior Publication Data

US 2002/0174346 A1 Nov. 21, 2002

Related U.S. Application Data

(60) Provisional application No. 60/291,900, filed on May 18, 2001.

(51) Int. Cl.
*G06K 9/00* (2006.01)

(52) U.S. Cl. .............................. 726/5; 726/2; 713/168; 713/186; 382/116; 382/117; 382/118; 382/128

(58) Field of Classification Search .................. 713/185, 713/186, 168, 182; 382/100, 115–119, 124–126, 382/128; 709/223, 225; 726/9, 2–6; 235/375
See application file for complete search history.

(56) References Cited

U.S. PATENT DOCUMENTS

| | | | |
|---|---|---|---|
| 4,993,068 A | 2/1991 | Piosenka et al. ............ 713/186 |
| 5,263,165 A | 11/1993 | Janis ........................... 711/163 |
| 5,499,297 A | 3/1996 | Boebert ....................... 380/23 |
| 5,719,950 A | 2/1998 | Osten et al. ................. 382/115 |
| 5,721,906 A | 2/1998 | Siefert ........................ 395/609 |
| 5,721,914 A | 2/1998 | DeVries ..................... 395/615 |
| 5,724,575 A | 3/1998 | Hoover et al. .............. 395/610 |
| 5,761,662 A | 6/1998 | Dasan ......................... 707/10 |
| 5,768,577 A | 6/1998 | Kleewein et al. ........... 395/610 |
| 5,802,199 A | 9/1998 | Pare, Jr. et al. ............. 382/115 |
| 5,841,888 A | 11/1998 | Setlak et al. ................ 382/124 |
| 5,857,028 A | 1/1999 | Frieling ...................... 382/116 |
| 5,857,188 A | 1/1999 | Douglas ....................... 707/9 |
| 5,892,838 A | 4/1999 | Brady ......................... 382/115 |

(Continued)

FOREIGN PATENT DOCUMENTS

WO 98/16906 4/1998

(Continued)

OTHER PUBLICATIONS

International Search Report PCT/US 02/15469 dated Mar. 3, 2004.

(Continued)

*Primary Examiner*—Kristine Kincaid
*Assistant Examiner*—Yin-Chen Shaw
(74) *Attorney, Agent, or Firm*—Goodwin Procter, LLP

(57) ABSTRACT

The invention relates to systems and methods for using a template in the authentication process using biometric data. In one embodiment, a module modifies a template of the reference set of biometric data with the candidate set of biometric data when the user is authenticated. In another embodiment, a module modifies a copy of the template of the reference biometric data with modification data thereby creating a challenge template. The client compares the challenge template to a candidate set of biometric data thereby creating a response vector. A module authenticates the user based on the response vector and the modification data.

21 Claims, 5 Drawing Sheets

U.S. PATENT DOCUMENTS

| | | | | |
|---|---|---|---|---|
| 5,917,928 A * | 6/1999 | Shpuntov et al. | 382/124 |
| 5,930,804 A | 7/1999 | Yu et al. | 707/104 |
| 5,937,405 A | 8/1999 | Campbell | 707/10 |
| 5,963,945 A | 10/1999 | Pal | 707/10 |
| 5,966,705 A | 10/1999 | Koneru et al. | 707/9 |
| 5,977,964 A | 11/1999 | Williams et al. | 345/327 |
| 5,982,913 A | 11/1999 | Brumbley et al. | 382/124 |
| 5,982,914 A | 11/1999 | Lee et al. | 382/124 |
| 5,991,408 A | 11/1999 | Pearson et al. | 713/186 |
| 5,991,429 A | 11/1999 | Coffin et al. | 382/118 |
| 5,999,637 A | 12/1999 | Toyoda et al. | 382/124 |
| 6,000,033 A | 12/1999 | Kelley et al. | 726/8 |
| 6,016,476 A | 1/2000 | Maes et al. | 705/1 |
| 6,018,739 A | 1/2000 | McCoy et al. | 707/102 |
| 6,021,211 A | 2/2000 | Setlak et al. | 382/124 |
| 6,023,723 A | 2/2000 | McCormick et al. | 709/206 |
| 6,038,666 A * | 3/2000 | Hsu et al. | 713/186 |
| 6,041,411 A | 3/2000 | Wyatt | 713/200 |
| 6,047,281 A | 4/2000 | Wilson et al. | 707/3 |
| 6,047,282 A | 4/2000 | Wilson et al. | 707/3 |
| 6,052,730 A | 4/2000 | Felciano et al. | 709/225 |
| 6,061,790 A | 5/2000 | Bodnar | 713/171 |
| 6,070,159 A | 5/2000 | Wilson et al. | 707/3 |
| 6,076,167 A | 6/2000 | Borza | 713/201 |
| 6,144,959 A | 11/2000 | Anderson et al. | 707/9 |
| 6,144,962 A | 11/2000 | Weinberg et al. | 707/10 |
| 6,148,307 A | 11/2000 | Burdick et al. | 707/104 |
| 6,151,602 A | 11/2000 | Hejlsberg et al. | 707/10 |
| 6,151,643 A | 11/2000 | Cheng et al. | 710/36 |
| 6,160,903 A * | 12/2000 | Hamid et al. | 382/115 |
| 6,167,517 A * | 12/2000 | Gilchrist et al. | 713/186 |
| 6,181,807 B1 | 1/2001 | Setlak et al. | 382/124 |
| 6,182,076 B1 | 1/2001 | Yu et al. | 707/10 |
| 6,185,316 B1 * | 2/2001 | Buffam | 382/115 |
| 6,195,954 B1 | 3/2001 | Maeda | 707/3 |
| 6,202,159 B1 | 3/2001 | Ghafir et al. | 713/201 |
| 6,208,746 B1 * | 3/2001 | Musgrave | 382/100 |
| 6,212,290 B1 | 4/2001 | Gagne et al. | 382/125 |
| 6,237,006 B1 | 5/2001 | Weinberg et al. | 707/103 |
| 6,256,737 B1 | 7/2001 | Bianco et al. | 713/186 |
| 6,270,011 B1 * | 8/2001 | Gottfried | 235/379 |
| 6,282,303 B1 * | 8/2001 | Brownlee | 382/124 |
| 6,289,111 B1 | 9/2001 | Takhar | 382/115 |
| 6,289,462 B1 | 9/2001 | McNabb et al. | 726/21 |
| 6,292,795 B1 | 9/2001 | Peters et al. | 707/3 |
| 6,301,376 B1 * | 10/2001 | Draganoff | 382/124 |
| 6,311,272 B1 | 10/2001 | Gressel | 713/186 |
| 6,327,652 B1 | 12/2001 | England et al. | 713/2 |
| 6,334,124 B1 | 12/2001 | Bouchard et al. | 707/3 |
| 6,336,114 B1 | 1/2002 | Garrison | 707/9 |
| 6,338,066 B1 | 1/2002 | Martin et al. | 707/10 |
| 6,393,424 B1 | 5/2002 | Hallman et al. | 707/10 |
| 6,460,141 B1 | 10/2002 | Olden | 713/201 |
| 6,466,941 B1 | 10/2002 | Rowe et al. | 707/102 |
| 6,496,595 B1 * | 12/2002 | Puchek et al. | 382/124 |
| 6,498,861 B1 * | 12/2002 | Hamid et al. | 382/124 |
| 6,526,443 B1 | 2/2003 | Goldsmith et al. | 709/224 |
| 6,735,695 B1 * | 5/2004 | Gopalakrishnan et al. | 713/186 |
| 6,799,275 B1 * | 9/2004 | Bjorn | 713/186 |
| 6,826,696 B1 | 11/2004 | Chawla et al. | 713/201 |
| 6,829,712 B1 | 12/2004 | Madoukh | 713/200 |
| 6,851,051 B1 * | 2/2005 | Bolle et al. | 713/186 |
| 6,859,878 B1 | 2/2005 | Kerr et al. | 713/183 |
| 6,883,098 B1 | 4/2005 | Roman et al. | 713/200 |
| 2001/0000045 A1 | 3/2001 | Yu et al. | 707/9 |
| 2001/0011349 A1 | 8/2001 | Garrison | 713/165 |
| 2001/0025342 A1 * | 9/2001 | Uchida | 713/186 |
| 2001/0036299 A1 | 11/2001 | Senior | 382/124 |
| 2001/0037407 A1 | 11/2001 | Dragulev et al. | 709/250 |
| 2001/0049687 A1 | 12/2001 | Russell | 707/104 |
| 2002/0004839 A1 | 1/2002 | Wine et al. | 709/231 |
| 2002/0010857 A1 | 1/2002 | Karthik | 713/168 |
| 2002/0012432 A1 | 1/2002 | England et al. | 380/231 |
| 2002/0013772 A1 | 1/2002 | Peinado | 705/51 |
| 2002/0013785 A1 | 1/2002 | Miyazaki et al. | 707/104 |
| 2002/0016853 A1 | 2/2002 | Ressler | 709/236 |
| 2002/0016921 A1 | 2/2002 | Olsen et al. | 713/200 |
| 2002/0019884 A1 | 2/2002 | Gungabeesoon | 709/310 |
| 2002/0024419 A1 | 2/2002 | Dunn | 349/5.52 |
| 2002/0038426 A1 | 3/2002 | Pettersson et al. | 713/186 |
| 2002/0042883 A1 | 4/2002 | Roux et al. | 713/201 |
| 2002/0055912 A1 | 5/2002 | Buck | 705/76 |
| 2002/0056043 A1 | 5/2002 | Glass | 713/179 |
| 2002/0062452 A1 | 5/2002 | Ford | 713/201 |
| 2002/0083192 A1 | 6/2002 | Alisuag | 709/237 |
| 2002/0087869 A1 | 7/2002 | Kim | 713/186 |
| 2002/0091937 A1 * | 7/2002 | Ortiz | 713/200 |
| 2002/0133504 A1 | 9/2002 | Vlahos et al. | 707/104 |
| 2002/0161766 A1 | 10/2002 | Lawson et al. | 707/9 |
| 2002/0174010 A1 | 11/2002 | Rice, III | 705/14 |
| 2003/0005134 A1 | 1/2003 | Martin et al. | 709/229 |
| 2003/0033535 A1 | 2/2003 | Fisher et al. | 713/185 |
| 2003/0065986 A1 | 4/2003 | Fraenkel et al. | 714/47 |
| 2003/0140120 A1 | 7/2003 | Hartman | 709/219 |
| 2003/0154403 A1 | 8/2003 | Keinsley et al. | 713/201 |
| 2003/0177172 A1 | 9/2003 | Duursma et al. | 709/203 |
| 2004/0103409 A1 | 5/2004 | Hayner et al. | 717/143 |
| 2004/0148509 A1 * | 7/2004 | Wu | 713/186 |
| 2005/0015286 A1 | 1/2005 | Rudnikk et al. | 705/7 |
| 2005/0021975 A1 | 1/2005 | Liu | 713/182 |
| 2005/0030374 A1 | 2/2005 | Goldenberg et al. | 348/143 |
| 2005/0086255 A1 | 4/2005 | Schran et al. | 707/102 |
| 2005/0138426 A1 | 6/2005 | Styslinger | 713/201 |
| 2005/0144297 A1 | 6/2005 | Dahlstrom et al. | 709/229 |
| 2005/0154886 A1 | 7/2005 | Birk et al. | 713/168 |

FOREIGN PATENT DOCUMENTS

| | | |
|---|---|---|
| WO | 01/27723 | 4/2001 |
| WO | 02/03178 | 1/2002 |

OTHER PUBLICATIONS

International Search Report PCT/US 02/15466 dated Mar. 15, 2004.
Oracle Advanced Security Administrator's Guide Release 8.1.5 Chapter 7 "Configuring Identix Biometric Authentication", downloaded from http://cs.umbc.edu/help/oracle8/network.815/a67766/07_ident.htm, Dec. 6, 2006.

* cited by examiner

BIOMETRIC AUTHENTICATION WITH SECURITY AGAINST EAVESDROPPING

CROSS-REFERENCE TO RELATED APPLICATIONS

This application claims the benefit of and priority to the co-pending U.S. Provisional Application, Ser. No. 60/291,900, filed May 18, 2001, entitled "Network-Based Biometric Authentication," the entirety of which is incorporated herein by reference.

FIELD OF INVENTION

The invention relates generally to biometrics. More specifically, in one embodiment, the invention relates to systems and methods for using biometric authentication over a network.

BACKGROUND

The Internet accords a global community of computer users access to applications and information that traditionally were highly restricted. For example, users can now undertake a wide variety of financial transactions online, or obtain access to financial and other sensitive records online. The increased accessibility of such information, while enormously convenient, jeopardizes privacy and invites tampering and electronic theft. In some known prior art systems, sensitive information that was once physically guarded can now be obtained on the Internet by anyone who can generate the correct server URL, logon and password.

Indeed, the mere need for Internet users to keep track of multiple URLs, logon names, passwords and PINs in order to access different information further increases the chances of unauthorized use and loss of private information. Users may resort to using the same logon name and password combinations for all accounts, rendering them equally vulnerable if unauthorized access to a single account is obtained. On the other hand, security-conscious users who maintain different logon names and passwords for individual accounts may, to avoid confusion, write them down where they may be found or store them on easily stolen devices such as personal digital assistants—thereby undermining their own efforts. It can be argued that those who routinely change their passwords but record them on paper or in a computer file are at greater risk of being compromised than those who use a single but difficult-to-crack password. At the very least, such security-conscious individuals risk forgetting their access information, necessitating time-consuming calls to customer-support lines.

From the perspective of authentication, passwords and PINs cannot guarantee identity; the identification is no more reliable than the security of the password. In some known prior art systems with password authentication, the server carrying out a transaction can only prove that the correct password was entered—not that it was entered by an authorized person. A password can originate from password-cracking software just as easily as from the real user. Digital certificates improve security by authenticating an end point (i.e., that a message originated with a particular client terminal), but cannot create a non-repudiated link to support the claim that a particular user really did engage in a transaction.

SUMMARY OF THE INVENTION

The present invention utilizes biometric indicia to offer highly reliable authentication that creates links that cannot be repudiated for transactions initiated within the context of an authenticated session. Unlike passwords, which are no more than secrets vulnerable to theft, biometrics validation matches physical characteristics of the user against stored characteristics to identify the user. Once a user is positively identified, in one embodiment, the server unlocks and validates the user's credentials for presentation to other servers that request such authentication. A user's credentials may, for example, represent an account login/password combination or X.509 certificate. This biometric approach offers substantial flexibility in terms of accessibility (from computers, mobile devices, etc.) and relieves the user from responsibility for managing the integrity of such credentials. Biometric scanners are inexpensive and small, and may, for example, be easily incorporated into keyboards and mobile client devices.

In one embodiment, the authentication process can use an adaptive learning algorithm to improve the accuracy and reliability of matching a candidate set of biometric data against a user's biometrics profile (e.g., a reference set of biometric data stored as, for example, a template). Candidate sets of biometric data that result in successful matches are used to augment the profile and improve the statistics need to establish a subsequent reliable match. Upon authentication, new biometric data are introduced into the reference set associated with the profile if it is dissimilar or covers different portions of the biometrics (e.g., different areas of a finger) than other biometric data in the profile (e.g., template). The end result of this process is a gradual tuning of the matching process to the peculiarities exhibited by a user, thereby enhancing accuracy, speed and flexibility. This adaptation also accommodates the gradual changes in a subscriber's biometric data (e.g., fingerprints) over time.

In another embodiment, the authentication process uses a challenge-response protocol. Using of the challenge-response protocol, neither the server nor the client transmit a full set of biometric data across the network during the authentication session. The server makes a copy of the user's biometric data and modifies the copy to generate a challenge template. The modifying can include eliminating some of the geometric data representing the biometric features (e.g., only including the x, y coordinates of a feature) and inserting fictitious data (e.g., random noise). The server transmits the challenge template to the client. The client receives the challenge template and compares the challenge template to a candidate set of biometric data. Based on the comparison, the client generates a response vector. The response vector can be, for example, a hash code. The client transmits the response vector back to the server. The response vector indicates the portions of the challenge template that did not match the candidate set of biometric data. The server, knowing what fictitious data was inserted into the challenge template can determine if the mismatches sufficiently match the fictitious data. If they do, the server can authenticate the user.

In one aspect, the invention relates to a method for authentication using biometrics. The method comprises providing a reference template with a reference set of biometric data associated with an individual and receiving an authentication request associated with a user. The method also comprises generating a copy of the reference template and modifying the copy of the reference template with modification data to generate a challenge template. In general, the method also comprises transmitting the challenge template, receiving a response vector based at least in part on the challenge template and a candidate set of biometric data, and authenticating the user as the individual associated with the reference set of biometric data based at least in part on the response vector and the modification data. In one embodiment, the method further includes receiving the candidate set of biometric data associated with the user and comparing the candidate set of biometric data with the challenge template in order to generate the response vector.

In another embodiment, the method further includes determining features in the candidate set of biometric data that match, and determining features in the candidate set of biometric data that do not match. The user may be authenticated as the individual associated with the reference set of biometric data if the degree of feature matching is not less than a predetermined threshold and the mismatched features sufficiently match the modification data.

In another embodiment, the method further includes registering the individual by generating the reference template with the reference set of biometric data from the individual. In yet another embodiment, the method further includes authenticating the user as the individual associated with the reference set of biometric data if at least a portion of the data represented by the response vector sufficiently matches the modification data. The modification data may contain, for example, random data. The response vector may be a hash result. In some embodiments, the reference template is a portion of a supertemplate.

In another aspect, the invention relates to a system for authentication using biometrics. The system preferably includes a reference template, a modification module and an authentication module. In general, the reference template has a reference set of biometric data associated with an individual. The modification module is preferably configured to generate a copy of the reference template and to modify the copy of the reference template with modification data to generate a challenge template. The authentication module may be configured i) to receive a response vector based at least in part on the challenge template and a candidate set of biometric data and ii) to authenticate a user as the registered individual in response to the response vector and the modification data.

In one embodiment, the system further comprises a client in communication with the server. The client preferably includes a comparator module configured to compare the candidate set of biometric data, associated with the user, with the challenge template in order to generate the response vector. In another embodiment, the comparator module is further configured i) to determine features in the candidate set of biometric data that match and ii) to determine features in the candidate set of biometric data that do not match.

The authentication module may authenticate the user as the individual associated with the reference set of biometric data if the degree of feature matching is not less than a predetermined threshold and the mismatched features sufficiently match the modification data. The system may comprise a registration module configured to generate the reference template with the reference set of biometric data from the individual. The authentication module may be further configured to authenticate the user as the individual associated with the reference set of biometric data if at least a portion of the data represented by the response vector sufficiently matches the modification data.

In another aspect, the invention relates to an article of manufacture having computer-readable program portions embodied therein for authentication using biometrics. The article comprises computer-readable program portions for performing the method steps described above.

BRIEF DESCRIPTION OF THE DRAWINGS

The above and further advantages of the invention may be better understood by referring to the following description taken in conjunction with the accompanying drawing, in which.

DETAILED DESCRIPTION

Figure 1:
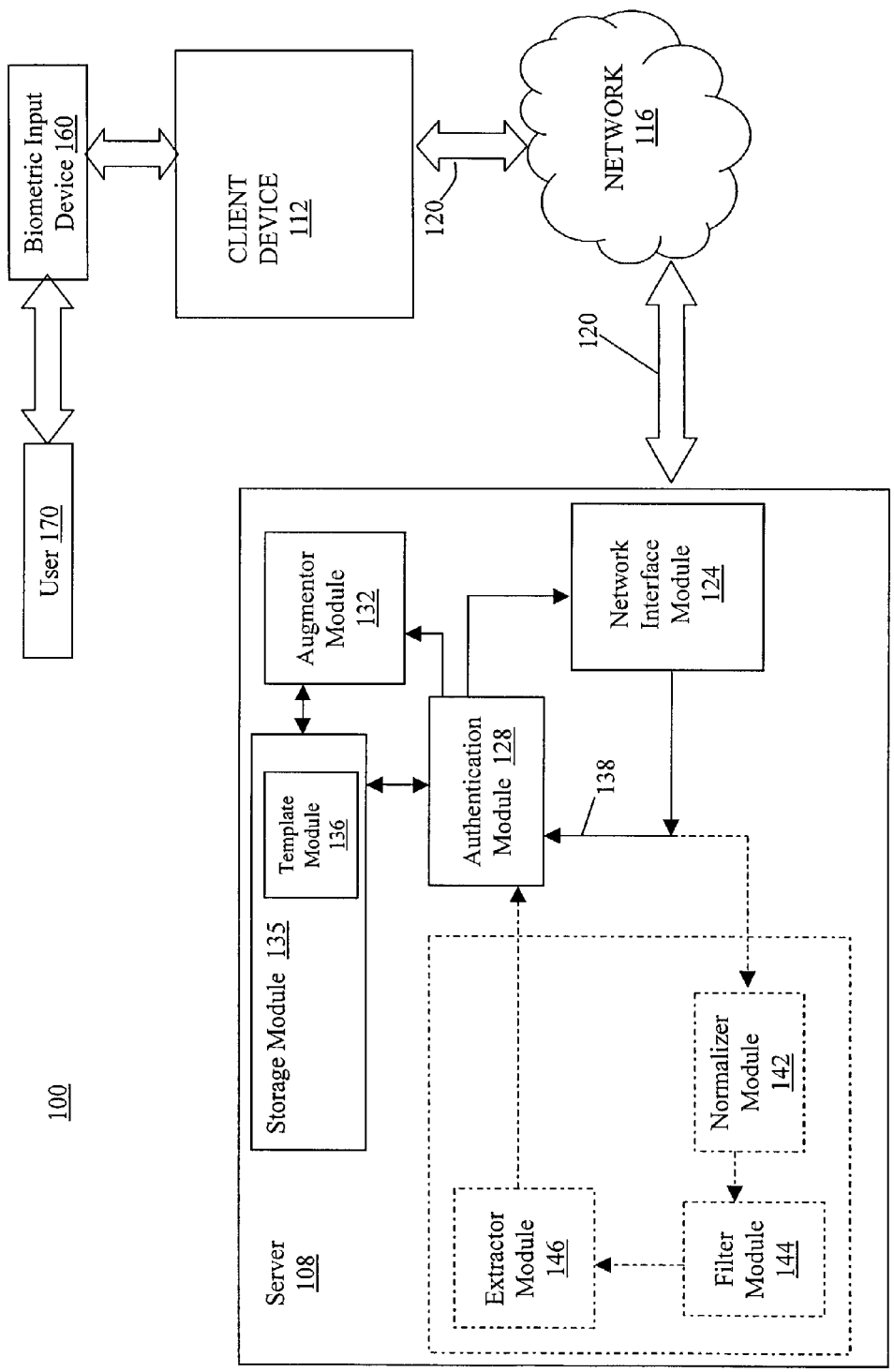
FIG. 1 is block diagrams of illustrative embodiments of a system to authenticate a user using augmented biometric data accordance with the invention.

In broad overview, FIG. 1 illustrates an embodiment of a system 100 to authenticate a user using augmented biometric data in accordance with the invention. The system 100 includes a first computing system ("a server node") 108 and a second computing system ("a client node") 112, all in communication with a network 116. The server node 108 and the client node 112 are in communication with the network using communication channels 120.

For example, the network 116 and the communication channels 120 can be part of a local-area network (LAN), such as a company Intranet, a wide area network (WAN) such as the Internet or the World Wide Web or the like. The nodes 108 and 112 communicate with the network 116 through the communication channels 120 using any of a variety of connections including, for example, standard telephone lines, LAN or WAN links (e.g., T1, T3, 56 kb, X.25), broadband connections (ISDN, Frame Relay, ATM), wireless connections and the like. The connections can be established using a variety of communication protocols (e.g., HTTP(S), TCP/IP, SSL, IPX, SPX, NetBIOS, Ethernet, RS232, direct asynchronous connections, a proprietary protocol and the like). In one embodiment, the server 108 and the client 112 encrypt all communication when communicating with each other.

The server node 108 can be any computing device capable of providing the services requested by the client node 112. Particularly, this includes authenticating a user at the client node 112 using biometric data, as described in more detail below. The server node 108 may include a network interface module 124, an authentication module 128, an augmentor module 132 and a storage module 135. The storage module 135 (which may be, for example, persistent memory, one or more hard disks, optical drives and the like) can include a template 136, in which a reference set of biometric data is stored. The server node 108 can also include one or more optional modules that add additional features for the collection of biometric data and are used in path 138, i.e., between the network interface module 124 and the authentication module 128. For example, the server 108 can include a normalizer module 142, a filter module 144 and/or an extractor module 146. The modules discussed throughout the specification are implemented as a software program and/or a hardware device (e.g., ASIC, FPGA, processor, memory, storage and the like). In one embodiment, one or more of the optional modules 142, 144 and/or 146 may be included on the client 112 instead of or in addition to the server 108. Placing the one or more of the optional modules 142, 144 and/or 146 on the client 112 distributes the processing task and lowers needed bandwidth on the network 116.

For clarity, FIG. 1 depicts server node 108 as a single server. It is to be understood, however, that the server node 108 can also be implemented, for example, distributed on portions of several (i.e., more than two) servers. The client node 112 can be any computing device (e.g., a personal computer, set top box, wireless mobile phone, handheld device, personal digital assistant, kiosk, etc) used to provide a user interface to access the server 108. The client node 112 receives biometric data from a biometric input device 160 (e.g., a fingerprint scanner, a retina scanner, a thermal imager, a skin spectrometer, a voice print analyzer, a digital camera and the like).

To use the system 100, a user 170, also referred to as a subscriber, registers that user's 170 biometric data with the system 100. In the illustrated embodiment, the client 112 receives biometric data from the biometric input device 160. The biometric data can include, for example, data associated with the individual's fingerprint(s), facial characteristics, voice and the like. The system 100 stores a set of biometric data associated with the user 170 in the storage module 135. In one embodiment, the biometric data is stored using an alias (e.g., a unique identifier with no personal or other type of information that can identify an individual), so that if the security of the storage module 135 is compromised, the biometric data cannot be associated with a particular individual.

In general overview, when the user 170 requests a service over the network 116 that requires authentication, the client device 112 receives a candidate set of biometric data from the biometric input device 160 and transmits it to the server node 108. The network interface module 124 receives the candidate set of biometric data and transmits it to the authentication module 128. The authentication module 128 retrieves a reference set of biometric data associated with the user 170 from the storage module 135. If the candidate set of biometric data sufficiently matches the reference set of biometric data, the authentication module 128 authenticates the user as the registered individual.

To authenticate, the authentication module 128 and/or the optional modules 142, 144 and/or 146 process the received candidate set of biometric data to extract the unique features that distinguish one set of biometric data (e.g., fingerprint) from another. For example, the normalizer module 142 normalizes the biometric data into a format used by the authentication module 128 and stored in the storage module 135. The normalization can include, for example, a translation algorithm, a transformation algorithm and the like. The normalization allows the biometrics data to be converted into a standard image suitable for subsequent processing and preferably includes geometric processing to adjust for size differences between sensors, orientation adjustments to invert or rotate images, density adjustments to correct for number of gray levels/dynamic range and sampling adjustments to account for different sensor resolutions. This allows the client device 112 to interface with different types of biometric input devices 160 (e.g., fingerprint readers produced by different manufacturers and having diverse capture resolutions or characteristics) without the need to re-register the user 170 or change the format of the biometric data in the storage module 135.

The filter module 144 filters the received candidate set of biometric data. The filtering can include standard filtering algorithms for correcting blurring of the image, for removing random noise in the image and the like. For example, all captured scans can be checked for partial or blurred prints that exhibit greater than expected amount of change between consecutive frames as well as contrast. Images that exhibit excessive blur can be rejected. Contrast issues can be resolved by asking the user to press down to make better contact with the sensor. Image processing software may be used to enhance the quality of the image and involve signal averaging, noise filtering, ridge/valley enhancement as well as gray scale equalization. The filtering can also include filtering algorithms needed because of the type of the biometric device 160 or the type of user features the biometric device 160 uses. The filtering can also include filtering algorithms based on the type of image (e.g., grainy, wet, fine grain and the like), the finger type and/or personal biometric characteristics (e.g., sex, age and the like). In an embodiment where the filter module 144 is implemented on the client 112, the filter module 114 operates in conjunction with the biometric input device 116 to perform blur removal, finger detection and time based enhancements. For example, two or more scans may be taken to ensure the user 170 has placed a stable finger (not moving) on the sensor. A difference is then taken between subsequent scans to ensure consistency between the two scans. With noisy sensors, the filter module 144 may integrate consecutive images to reduce the noise level in the captured image.

The extractor module 146 extracts the geometric data representing biometric features and/or minutiae from the candidate set of biometric data. In an embodiment where the extractor module 146 is implemented on the client 112, the extractor module 146 transmits the results to the authentication module 128 using the network 116. Biometric data, for example in the case of fingerprints, can be divided into global features that are spatial in nature and local features that represent details captured in specific locations. The geometric data can include, for example in the case of fingerprints, the locations (e.g., x, y coordinates) of the features, the type of feature (e.g., ridge ending, bifurcation and the like), the angular data of the features, the slope of the ridge, the neighborhood ridge counts and/or the like. Once the geometric data is processed, the authentication module 128 compares the data of the reference set of biometric data stored in the storage module 135 with the candidate set of biometric data to produce a goodness of fit or confidence of match by examining the local features on a minutia by minutia basis. To calculate the goodness of fit, the authentication module 128 determines the best spatial alignment between the location of minutiae points within the reference set of biometric data and corresponding minutiae points within the candidate set of biometric data. Determining the best spatial alignment involves, for example, finding the rotation angle that produces the greatest number of matching points. Matching can be a relative term, meaning the points are close to each other within some predefined distance. The determining process preferably accommodates both spatial and rotational displacement between the reference set of biometric data and the candidate set of biometric data. This may be accomplished, for example, using a spatial correlation algorithm in which the features of the candidate set of biometric data are translated and rotated about a test alignment point and then compared against the features in the reference set. Different alignment points and rotation angles are tested to determine the lowest difference between the candidate and reference feature set. Once the differences between the local features at each of the matching minutiae points are minimized, the authentication module 128 sums the goodness of fit.

The authentication module 128 determines the sufficiency of the match by statistically analyzing the goodness of fit for local features at each of the matching minutiae points and determining whether the probability that they come from the same individual is above a certain predetermined threshold. In one embodiment, an administrator of the system 100 sets the predetermined threshold. The predetermined threshold determines both the false acceptance rate (i.e., the probability that the authentication module 128 will incorrectly authenticate a user) and the false rejection rate (i.e., the probability that the authentication module 128 will incorrectly reject the user when that user is in fact the registered individual). The administrator sets the predetermined threshold such that the false acceptance rate and the false rejection rate are both acceptable to the users of the system 100.

In addition, with the sufficient match, the authentication module 128 transmits the candidate set of the biometric data to the augmentor module 132, which in turn modifies the current reference set of biometric data (e.g., template 136) using the candidate set of biometric data. The modification can include several different aspects of the reference biometric data. For example, one aspect is the spatial aspect (e.g., the associated data representing geometric features) of the reference set of the biometric data. Another aspect is the statistical aspect (e.g., the weighting and/or confidence level of features) of the reference set of the biometric data.

Figure 2:
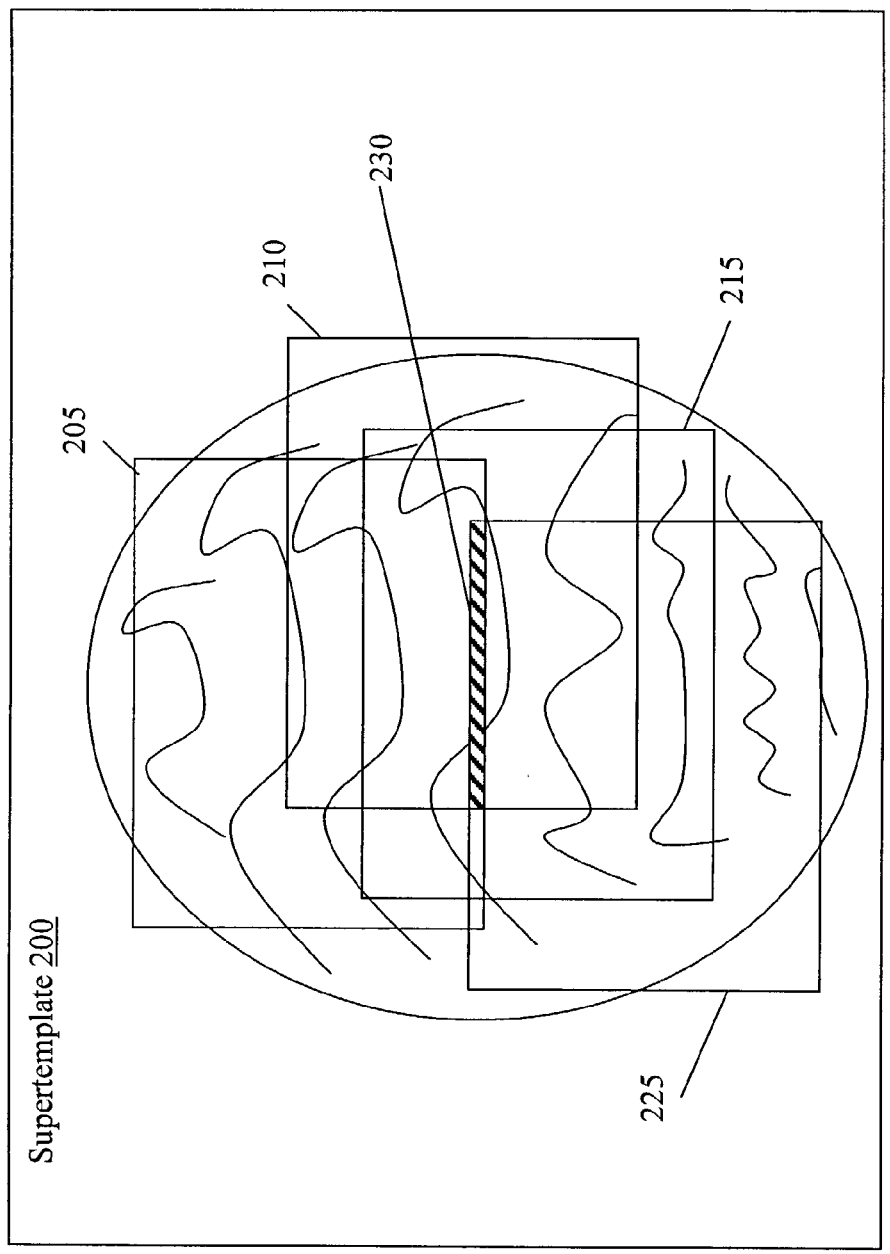
FIG. 2 is a block diagram of an illustrative embodiment of a supertemplate used to authenticate a user in accordance with the invention.

FIG. 2 illustrates an exemplary embodiment of a supertemplate 200 used to authenticate a user in accordance with the invention. The supertemplate 200 represents a set of biometric data corresponding to a complete set of biometric data. For example, in a fingerprint system, the supertemplate 200 represents the complete set of biometric data for one digit. Superimposed on the supertemplate 200 are a first set of biometric data 205, a second set of biometric data 210, a third set biometric data 215 and a fourth set of biometric data 220. As illustrated, the sets of biometric data 205, 210, 215 and 220 are smaller in size than the supertemplate 200. In one embodiment, the sets of biometric data 205, 210, 215 and 220 represent templates 136. The supertemplate 200 can comprise one or more templates 136. The size of the sets of biometric data 205, 210, 215 and 220 are based on the biometric input device 160. For example, the size of the scanner, the size of the local memory and the like. It is noteworthy that even if the scanner is large enough to cover the entire finger the supertemplate 200 can accumulate additional information from multiple templates 205, 210, 215 and 220 to generate more accurate statistics for the features.

For an illustrative example of the modifying process, a reference set of biometric data is the supertemplate 200 and a candidate set of biometric data for a first authentication request is equivalent to the biometric data represented in the first set of biometric data 205. As described above, upon a sufficient match, the augmentor module 132 modifies the supertemplate 200 using the candidate set of biometric data. For the sufficient match, the authentication module 128 matches features of the candidate set of biometric data with features of the reference data included in the supertemplate 200. The augmentor module 132 aligns those matched features to determine how the candidate set of biometric data fits into the supertemplate 200.

When the augmentor module 132 determines the alignment, the augmentor 132 modifies the template 200 using the candidate set of biometric data. The results are that in this illustrative example, the area indicated as the first set of biometric data 205 is modified with the candidate set of biometric data. In one embodiment, the augmentor module 132 modifies by replacing the features in the existing reference biometric data in the area indicated as the first set of biometric data 205 with the candidate set of biometric data received by the client 112. In this way, the system accommodates feature changes that occur over time (e.g., due to aging of the user). In another embodiment, the augmentor module 132 augments the existing reference biometric data by adding in those features of the candidate set of biometric data that are not matched and/or not presently included in the reference set of biometric data. This allows the system 100 to build a fuller biometric representation than would be possible with, for example, a single scan by the biometric input device 160. Augmented in this fashion, the supertemplate 200 can evaluate scans covering different portions of, for example, the user's fingerprint, increasing the system's tolerance for variation without sacrificing accuracy (i.e., the number of feature points matched).

Continuing with the illustrative example of the modifying process, a candidate set of biometric data for a second authentication request is equivalent to the biometric data represented in the second set of biometric data 210. As described above, upon a sufficient match, the augmentor module 132 aligns those matched features to determine how the candidate set of biometric data fits into the supertemplate 200. Once the augmentor module 132 determines the alignment, the augmentor 132 modifies the template 200 using the candidate set of biometric data. The results are that in this illustrative example, the area indicated as the second set of biometric data 210 is modified with the candidate set of biometric data. Similarly in subsequent authentication requests, the augmentor module 132 modifies the areas indicated as the third and fourth sets of biometric data, 220, 225 respectively.

As described above, in addition to the modification of features, the augmentor module 132 also modifies the statistical parameters of the reference set of biometric data. Each time features in a candidate set of biometric data match the features of the reference set biometric data, the augmentor module 132 increases the weighting and/or confidence level of those matched features. The area 230, indicated by shading, represents the overlap of all of the sets of biometric data (205, 210, 215 and 225). The weighting and/or confidence level of the matched features in this area 230 is the highest, as it has been reinforced by the redundant presence of the matched features in each of the four received candidate sets of biometric data. The closeness of the match can also affect the value of the weighting and/or confidence level. For example those features that directly overlap with two candidate sets of biometric data have a higher weighting and/or confidence level than those features that are close, but have some small distance between them.

Figure 3:
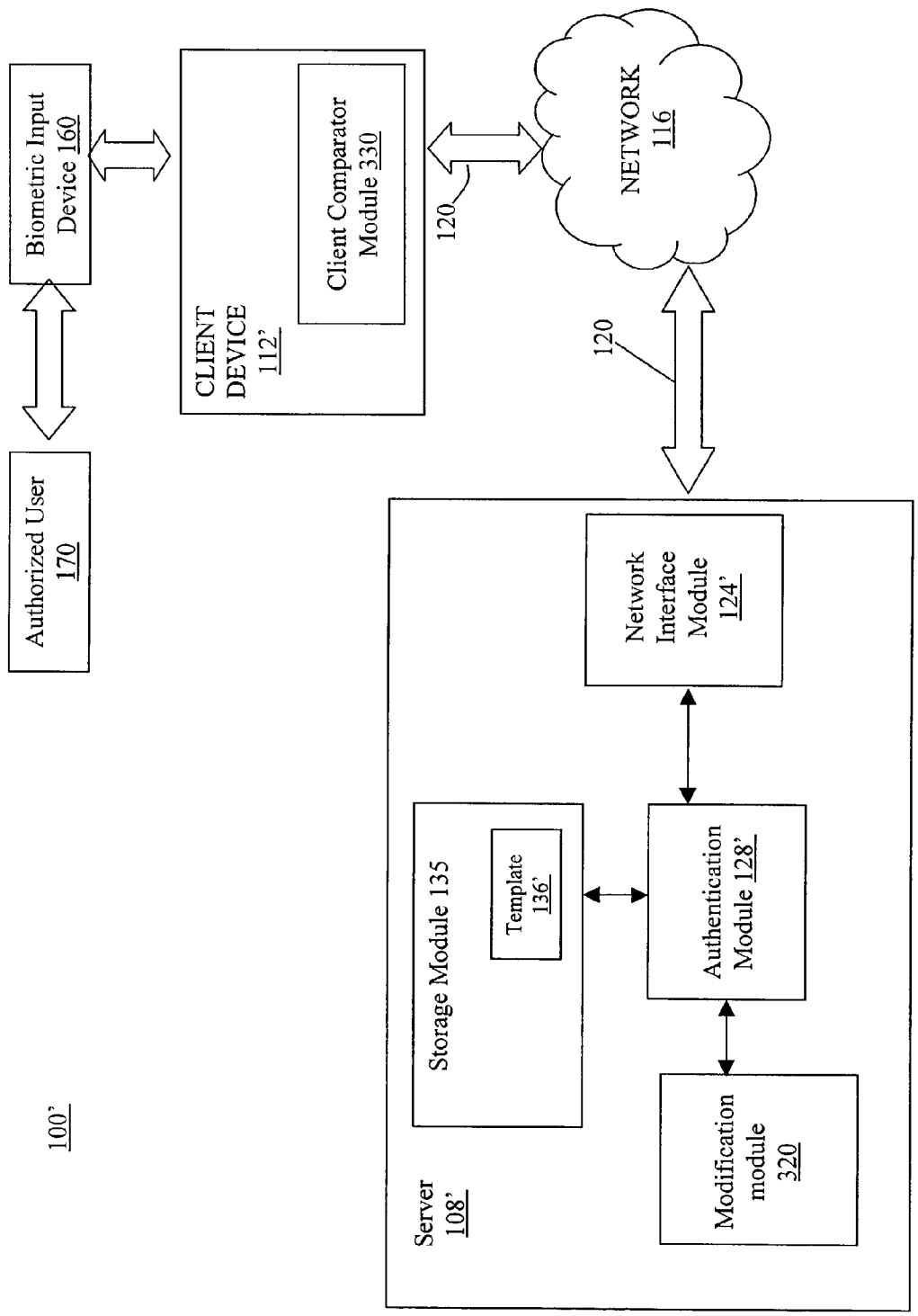
FIG. 3 is a block diagram of another illustrative embodiment of a system to authenticate a user using augmented biometrics in accordance with the invention.

In broad overview, FIG. 3 illustrates another embodiment of system 100' to authenticate a user using augmented biometric data in accordance with the invention. The server node 108' of the system 100' includes a network interface module 124', an authentication module 128', a storage module 135, having a template 136' stored therein, and a modification module 320. The client node 112' of the system includes a client comparator module 330.

Figure 4:
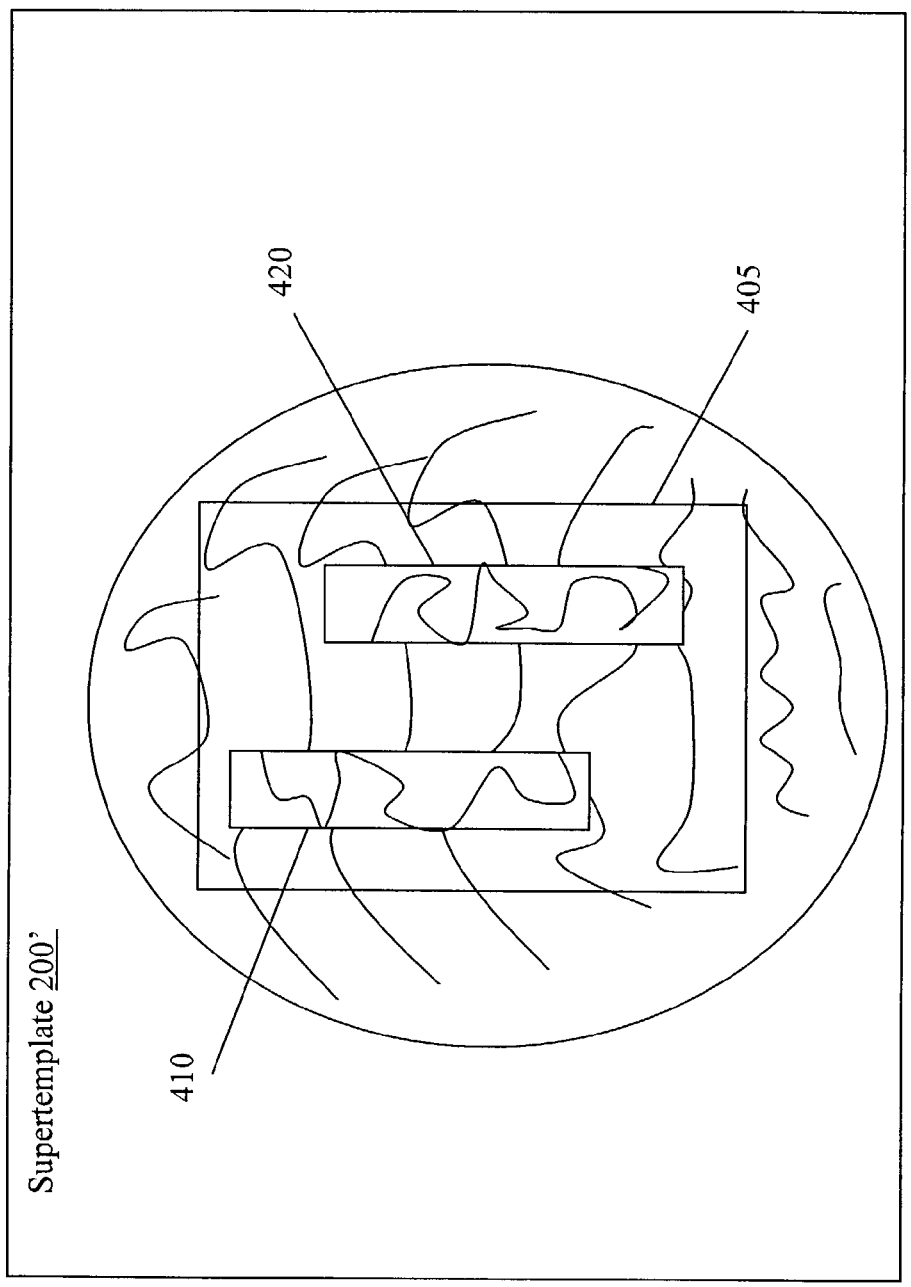
FIG. 4 is a block diagram of another illustrative embodiment of a supertemplate used to authenticate a user in accordance with the invention.

To use the system 100', the user 170 registers that user's 170 biometric data with the system 100', as described above. For authenticating, the server 108' and client 112' use a challenge-response protocol that does not transmit a full set of biometric data across the network 116. This challenge-response protocol modifies a portion of the set of biometric data sent across the network 116 so that if intercepted by someone, it is not usable in its modified state. FIG. 4 depicts a supertemplate 200' that the system 100' employs to implement the challenge-response protocol. The supertemplate 200' includes a challenge template 405 that represents a set of biometric data. In one embodiment, the challenge template 405 is equivalent in area to the template 136'. As described above, the template 136' varies in size and is at least a portion of the supertemplate 200'. The challenge template 405 includes a first portion 410 and a second portion 420. As illustrated, the first portion 410 and the second portion 420 include random feature data, as described in more detail below.

Figure 5:
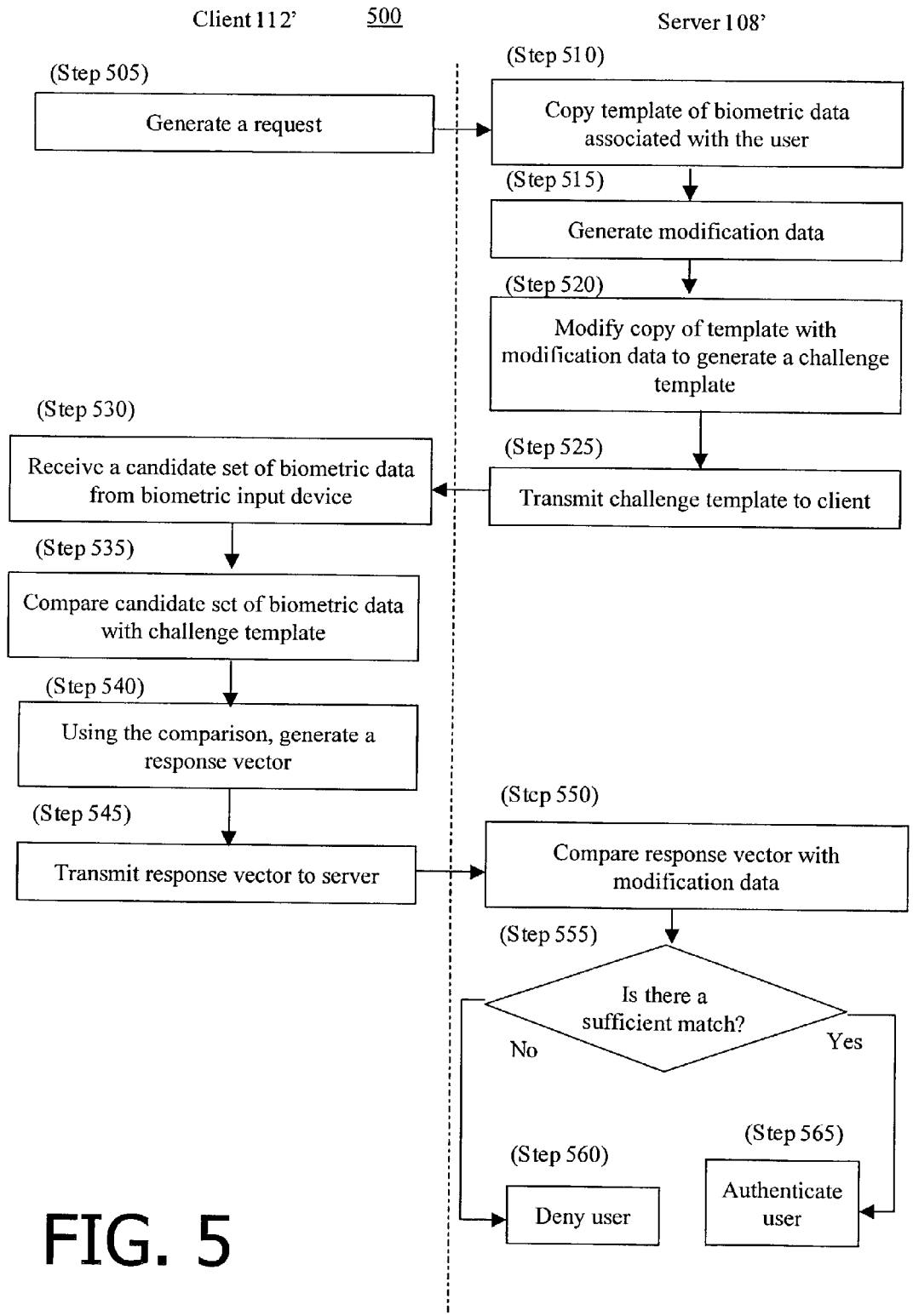
FIG. 5 is a flow diagram of an illustrative embodiment of a process to authenticate a user using augmented biometrics in accordance with the invention.

FIG. 5 illustrates an embodiment of a process 500 to authenticate a user 170 using the challenge-response protocol, a system 100' as depicted, for example, in FIG. 3 and a challenge template 405 as depicted, for example, in FIG. 4. In operation, the client 112', in response to a user 170 action, generates (step 505) a request. The request can be an authentication request directly from the client 112 to authenticate the user 170. The request can also be a service request for a certain service (e.g., execution of an application program, access to a financial or medical database, access to an electronic vault with which the user 170 is associated, download of data and/or an application program, and the like) provided by a server on the network (e.g., 108' or a different application server). In that case, the server providing the requested service transmits a request for authentication to the authentication module 128'.

In response to the authentication request, the modification module 320 copies (step 510) the template 136' of the reference biometric data associated with the user 170. The modification module 320 generates (step 515) modification data and uses this modification data to modify (step 520) the copy of the template to generate a challenge template 405. For an illustrative example, the modification module 320 copies (step 510) at least a portion of the geometric data contained within the reference template 136', for example, the x, y coordinates of the features. To generate the modification data, the modification module 320 generates random x, y locations and thereby generates random modified features at these locations in the challenge template 405. In another embodiment, the modification data is not random but generated by an algorithm that is dependent on the biometric data, thus creating different modification data for different users. The modification module 320 modifies (step 520) the copy of the reference template (i.e., challenge template 405) by inserting the modification data into the challenge template 405, for example at the random x, y locations. The modification module 320 can also create the modification data used for the challenge template 405 by combining features from other users or other fingers to create a composite that is similar to real data because the modification data is based on real biometric data. For example, the modification module 320 can create the composite modification data from other users and then align the end points when inserting this composite modification data in portion 410, so it looks like real data, but would not be matchable without knowing which areas were false.

For clarity and illustration only, the modification data for this particular request of the illustrated process 500 fall within the first and second portions, 410 and 420 respectively, of the challenge template 405. Of course, if the modification data were random, then the modified x, y coordinates would be distributed randomly throughout the challenge template area. In another embodiment, the modification module 320 can insert random noise in portions of the challenge template 405, for example, in the first and second portions, 410 and 420 respectively. Once the modification module 320 generates the challenge template 405, the server 108' transmits the challenge template 405 to the client 112. As stated above, with random data inserted in the first location 410 and the second location 420, even if the challenge template 405 is copied by an eavesdropper, the challenge template 405 is not usable because the biometric data in those locations will not match reference biometric data (e.g., reference template 136') stored for that user in biometric authentication systems.

The comparator module 330 of the client 112' receives (step 530) a set of candidate biometric data from the biometric input device 160. The comparator module 330 compares (step 535) the candidate set of biometric data with the received challenge template 405. The comparator module 330, for example, can spatially align the candidate set of biometric data with the challenge template 405, maximizing the number of matching features, and then calculate a degree of overlapping (i.e., matching) of the features at various x, y coordinates. The comparator module 330 generates (step 540) a response vector, for example, listing the x, y coordinates and the degree of matching. Another format can include the actual candidate features found in all matching areas. Other formats for the response vector include listing the x, y coordinates that are above (or below) a certain threshold, listing the x, y coordinates with no matching features, generating a hash code using the challenge template 405 and the candidate set of biometric data, and the like. The client 112' transmits the response vector back to the server 108'. The transmitted response vector does not include a full set of biometric data, so it is not usable if someone intercepts it.

The authentication module 128' receives the response vector and compares (step 550) the response vector with the modification data. The authentication module 128' determines (step 555) if the comparison between the response vector and the modification data indicates that there is a sufficient match, or in other words, that the user 170 is, to a statistical degree of certainty, the registered individual. If the authentication module 128' determines that the comparison indicates there is not a sufficient match, the authentication module 128' denies (step 560) the user 1780 as the registered individual. If the authentication module 128' determines that the comparison indicates there is a sufficient match, the authentication module 128' authenticates (step 565) the user 1780 as the registered individual.

Ideally, when the user 170 is the registered individual, the mismatches identified in the response vector coordinate with the modification data in the first location 410 and the second location 420, while the features outside of these locations match to a high degree of probability. Deviations from this ideal can be caused by noise introduced by the biometric input device 160, different sizes of the candidate set of biometric data and the challenge template 405, rotation and/or motion of the user's finger while scanning, and the like. As described above, the authentication module 128' statistically analyzes the mismatches, accounting for those due to the modification data, and determines to a statistical certainty whether the matches indicate that the user 170 is the registered individual.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for authentication using biometrics, the method comprising:
   providing, at a server, a reference template with a reference set of biometric data associated with an individual;
   receiving, at the server, an authentication request from a client associated with a user;
   generating a copy of the reference template;
   in response to receiving the authentication request, modifying the copy of the reference template with modification data to generate a challenge template, and transmitting the challenge template from the server to the client;
   receiving a response vector based at least in part on the challenge template and a candidate set of biometric data; and
   authenticating the user as the individual associated with the reference set of biometric data based at least in part on the response vector and the modification data.

2. The method of claim 1 further comprising:
   receiving the candidate set of biometric data associated with the user; and
   comparing the candidate set of biometric data with the challenge template thereby generating the response vector.

3. The method of claim 2 wherein the comparing step further comprises:
   determining features in the candidate set of biometric data that match; and
   determining features in the candidate set of biometric data that do not match.

4. The method of claim 3 wherein the authenticating step further comprises authenticating the user as the individual associated with the reference set of biometric data if the matched features exceed a predetermined threshold and the mismatched features match the modification data.

5. The method of claim 1 further comprising registering the individual by generating the reference template with the reference set of biometric data from the individual.

6. The method of claim 1 wherein the authenticating step further comprises authenticating the user as the individual associated with the reference set of biometric data if at least a portion of the data represented by the response vector matches the modification data and not authenticating the user otherwise.

7. The method of claim 1 wherein the modification data contains random data.

8. The method of claim 1 wherein the response vector is a hash result.

9. The method of claim 1 wherein the reference template is a portion of a supertemplate.

10. A system for authentication using biometrics, the system comprising
    a server device storing:
    a reference template having a reference set of biometric data associated with an individual requesting authentication from a client machine;
    a modification module configured to generate, in response to receiving an authentication request, a copy of the reference template and to modify the copy of the reference template with modification data to generate a challenge template;
    a network interface module configured to receive the authentication request and transmit the challenge template to the client in response thereto; and
    an authentication module configured i) to receive a response vector based at least in part on the challenge template and a candidate set of biometric data and ii) to authenticate a user as the registered individual in response to the response vector and the modification data.

11. The system of claim 10 wherein the modification data contains random data.

12. The system of claim 10 wherein the response vector is a hash result.

13. The system of claim 10 wherein the template is a portion of a supertemplate.

14. The system of claim 10 wherein the client comprises a comparator module configured to compare the candidate set of biometric data, associated with the user, with the challenge template thereby generating the response vector.

15. The system of claim 14 wherein the comparator module is further configured i) to determine features in the candidate set of biometric data that match and ii) to determine features in the candidate set of biometric data that do not match.

16. The system of claim 15 wherein the authentication module is further configured to authenticate the user as the individual associated with the reference set of biometric data if the matched features exceed a predetermined threshold and the mismatched features match the modification data.

17. The system of claim 10 further comprising a registration module configured to generate the reference template with the reference set of biometric data from the individual.

18. The system of claim 10 wherein the authentication module is further configured to authenticate the user as the individual associated with the reference set of biometric data if at least a portion of the data represented by the response vector matches the modification data and not authenticating the user otherwise.

19. An article of manufacture storing computer-readable program portions embodied therein for authentication using biometrics, the article comprising:
    a computer-readable program portion for providing, at a server, a reference template with a reference set of biometric data associated with an individual;
    a computer-readable program portion for receiving, at a server, an authentication request, from a client associated with a user;
    a computer-readable program portion for generating a copy of the reference template;
    a computer-readable program portion for modifying the copy of the reference template with modification data to generate a challenge template in response to receiving the authentication request;
    a computer-readable program portion for transmitting the challenge template from the server to the client;
    a computer-readable program portion for receiving a response vector based at least in part on the challenge template and a candidate set of biometric data; and
    a computer-readable program portion for authenticating the user as the registered individual based at least in part on the response vector and the modification data.

20. The article of claim 19 further comprising a computer-readable program portion for receiving the candidate set of biometric data associated with the user; and a computer-readable program portion for comparing the candidate set of biometric data with the challenge template thereby generating the response vector.

21. The article of claim 20 further comprising a computer-readable program portion for registering the individual by generating the reference template with the reference set of biometric data from the individual.

* * * * *